United States Patent Office 3,752,885
Patented Aug. 14, 1973

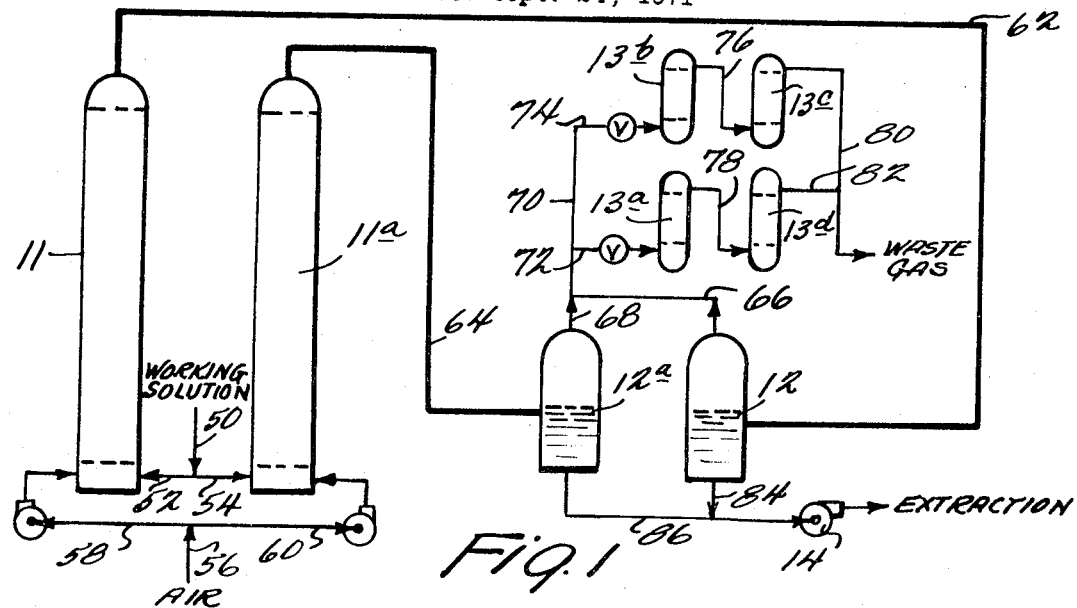
Fig. 1
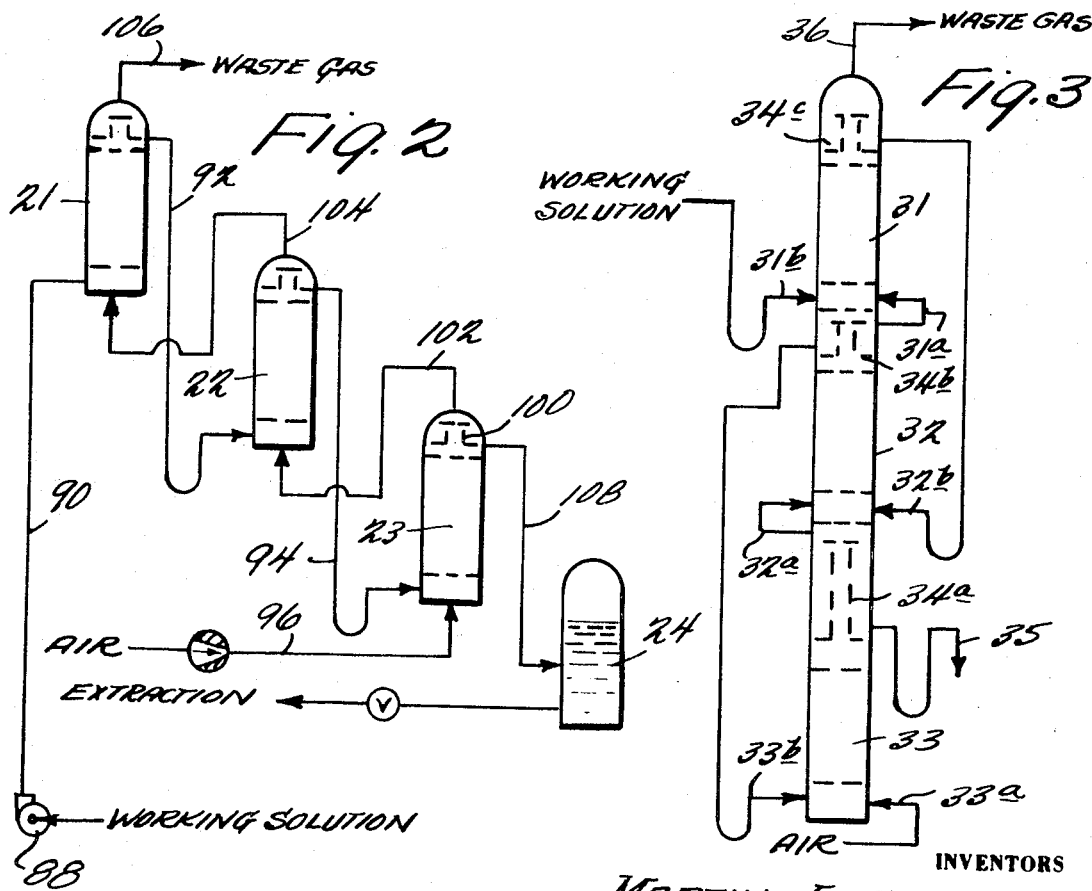
Fig. 2
Fig. 3

3,752,885
PROCESS FOR THE PRODUCTION OF HYDROGEN PEROXIDE
Martin Liebert, Frankfurt, Heinz Delle, Bad Homburg vor der Hohe, and Gerhard Kabisch, Rheinfelden, Germany, assignors to Deutsche Gold- und Silber-Scheideanstalt vormals Roessler, Frankfurt am Main, Germany
Filed Sept. 24, 1971, Ser. No. 183,561
Claims priority, application Germany, Jan. 26, 1970, P 20 03 268.2
Int. Cl. C01b 15/02; B01l 11/00
U.S. Cl. 423—588     15 Claims

ABSTRACT OF THE DISCLOSURE

The oxidation step in the anthraquinones process for producing hydrogen peroxide is carried out in a plurality of stages in an apparatus arranged for separating gas and liquid phases. The hydroquinone containing working solution is conducted in each stage in parallel flow from bottom to top with one oxygen containing gas. The stage with the highest hydroquinone concentration in the working solution is led to the gas mixture most depleted in oxygen and the fresh gas mixture is introduced into the stage which contains the working solution poorest in hydroquinone.

---

The present invention is directed to a process for the production of hydrogen peroxide by the anthraquinone process and is especially concerned with improving the oxidation step of this cyclic process.

It is known in this process to dissolve an anthraquinone derivative as the reaction carrier in a solvent and to hydrogenate in the presence of a catalyst the working solution obtained so that about 50% of the quinones are converted into the corresponding hydroquinones. In the oxidation step, the hydroquinone solution is treated with an oxygen containing gas whereby the quinone is reformed while simultaneously hydrogen peroxide is formed and then is isolated from the working solution. Most of the known process for isolating the $H_2O_2$ from the working solutions involve an extraction with water. By returning the working solution to the hydrogenation step and repeatedly rotating the named individual steps there is obtained a cyclic process in which hydrogen peroxide is practically synthesized from the gases hydrogen and oxygen (from the air) with the act of the reaction carrier dissolved in the working solution.

In carrying out the oxidation industrially, there is the problem chemically to carry out the synthesis as quantitatively as possible while avoiding breakdown reactions of the compounds of the working solution. In regard to carrying out the oxidation step industrially one is concerned with carrying out in the reaction in an energy saving manner using the smallest possible apparatus.

The chemical requirements are considered in a series of processes whose improvements consist, for example, in the production of extensively oxidation stable working solutions for example according to German Offenlegungs-schrift 1,945,750 (Kabisch U.S. application 69,151 filed Sept. 2, 1970) or in the mode of action of regenerating breakdown products formed by the oxidation for example according to German Pat. 1,273,499. However, the oxidation step in the large industrial plants for the anthraquinone process also is in need today not only of more energy (flow) than all the rest of the cyclic apparatus together, but it also requires the inclusion of the by far proportionally largest apparatus in the cycle. Therefore there has not been a lack of proposals for industrially improving the oxidation step.

Thus in the former BASF plant the oxidation of the hydrogenated working solution was carried out in four gasification towers arranged consecutively (CIOS Report File No. XXI–15, File XXVII–84, File XXV–44), which are always gassed with a fresh $N_2$-$O_2$ mixture, which volumewise correspond about to the composition of air. The waste gas depleted in $O_2$ by passage through the tower is recycled and by dosing with $O_2$ is brought to the original composition.

At high contents of tetrahydroanthrahydroquinone derivatives in the working solution which cause a reduction in the oxidation rate, according to a proposal in Jenney U.S. Pat. 3,073,680 attention should be paid to the maintenance of specified bubble sizes and cross section load. Accordingly, the gas distributor should have pore openings of 0.15 to 0.40 mm. diameter and air is employed in the $O_2$-$N_2$ mixture dosed into the towers arranged consecutively having a cross section load of 36–72 cubic meters/sq. meter×hour (cu. m./sq. m.×h.).

Both described processes have the disadvantage that they are burdened with a large apparatus expenditure. It is also a disadvantage that with smaller pore openings in the gas distributor the gas bubbles become smaller whereby the separation of the foam formed causes difficulties and the means for gas distribution (for example frits) are easily clogged.

In another process described in Cosby U.S. Pat. 2,902,347 the oxidation is characterized by a countercurrent passage. The hydroquinone solution to be oxidized is fed to the head of a packed column and flows against the uprising air fed into the bottom of the column. The charge of this countercurrent is limited by a very low flood boundary and furthermore has the disadvantage that the apparatus expense is very great because of the several columns arranged consecutively if the working solution to be oxidized has a high tetra content. In the industrial carry out of the cycling of the working solution for months at a time, however, there cannot be avoided to the tetra content of the working solution. For these reasons there have been proposed apparatus arrangements for the oxidation of the tetra system which are described repeatedly in the literature, for example, Chem. Age. 82, 895 (1958), Chem. and Ind. 1959, page 76, Chem. Process Eng. 40, No. 1, 5 (1959), Brit. Chem. Eng. 4, 88 (1959), and The Ind. Chemist 35, 9 (1959).

In the drawings, FIG. 1 illustrates the old apparatus arrangement and process employing concurrent flow, FIG. 2 illustrates one form of apparatus arrangement and process of the invention, and FIG. 3 illustrates a preferred apparatus and process according to the invention.

Referring more specifically to FIG. 1 both towers 11 and 11a have a height of 18.3 meters and a diameter of 3.7 meters. The hydroquinone working solution is introduced via conduit 50 and conduit 52 to the bottom of tower 11 and via conduit 50 and conduit 54 to the bottom of tower 11a. Air is similarly introduced via conduit 56 and conduit 58 to the bottom of tower 11 and via conduit 56 and conduit 60 to the bottom of tower 11a. The air and working solution are forced upward in parallel flow through a layer of packing. The working solution-waste gas mixture is fed either via conduit 62 to separator 12 or via conduit 64 to separator 12a where the gas and liquid are separated. The waste gas as shown goes via conduits 66, 68, 70, 72, or 74 to after provided activated carbon towers 13a or 13b, then via conduits 76 or 78 to activated carbon towers 13c or 13d. In the activated carbon towers, the waste gas is freed of residual solvent (working solution) and leaves via conduits 80 and 82. The residual working solution can then be recovered and reused. The oxidized working solution leaves the bottom of separator 12 via conduit 84 and separator 12a via conduit 86 and is pumped by pump 14 to the extraction step.

It has now been found that the energy requirements and the apparatus yield of an oxidation step while retaining the parallel flow from the bottom to the top according to FIG. 1 can be substantially improved if there is employed, for example, in the oxidation stage a column provided with obstruction or packing, in which the hydrogenated working solution and the oxidation gas, air or an oxygen containing gas are led in parallel or concurrent flow from bottom to top in several columns or sections divided in such a way that the section with the highest hydroquinone concentration is provided with the least oxygen concentration and conversely. If more than two sections are provided as the hydroquinone concentration goes up from section to section the oxygen concentration goes down.

FIG. 2 shows in schematic fashion one method of carrying out the invention. The working solution to be oxidized is fed with the help of pump 88 via conduit 90 to the bottom of packed column 21 and then flows from the top column 2' via conduit 92 to the bottom of packed column 22 and next flows from the top of column 22 via conduit 94 to the bottom of packed column 23. The oxidation gas-fresh gas, e.g., air, is first introduced via conduit 96 to the bottom of tower 23 in which the hydroquinone concentration is the lowest and flows in parallel with the working solution in tower 23 from bottom to top through a packed layer. At the top of each column the gas-liquid mixture is separated by suitable obstructions such as that at 100. The exhaust gas from tower 23 is led via conduit 102 to the bottom of tower 22 and finally via conduit 104 to the bottom of tower 21 where the gas which is now greatly depleted in oxygen is reacted with the fresh working solution which contains the highest hydroquinone concentration. The waste gas leaves the top of tower 21 via conduit 106.

The oxidized working solution is led from the top of tower 23 via conduit 108 to the buffer feed vessel 24 of the extraction step.

A preferred form of the invention which is distinguished by an especially simple apparatus construction in the new oxidation system is shown schematically in FIG. 3. The hydrogenated working solution flows into the bottom of upper section 31 of the packed oxidation tower and then flows from the top of section 31 to the bottom of section 32 and next flows from the top of section 32 to the bottom of section 33 of the tower. The oxidation-fresh gas is first fed via conduit 33a into section 33 in which the working solution is extensively oxidized and flows in parallel flow from bottom to top, for example, through a packed layer, with the liquid introduced via conduit 33b. In the upper part of the section, there is provided a device 34a suitable for gas-liquid separation. This upper section is also so designed volumewise that it can serve as the buffer or feed vessel of the subsequent extraction step. The liquid can be led off to the extraction step through conduit 35. The exhaust gas from section 33 enters section 32 via conduit 32a and subsequently via conduit 31a enters section 31 through which it is again led from bottom to top in parallel flow with the fresh hydroquinone solution introduced via conduit 31b and the waste gas depleted of oxygen finally leaves the oxidation tower via conduit 36. The liquid leaving section 31 at the upper end goes via conduit 32b into section 32 and from there, as already mentioned, goes via conduit 33b into section 33. The schematically indicated apparatus for phase separation always shown in the upper part of each section in FIGS. 2 and 3 (FIG. 3 indicated at 34a, 34b and 34c) can be situated either outside or inside the true apparatus or sections. Preferably, it is placed inside whereby it is well suited as phase separation apparatus of known components, for example, cyclones working according to the principle of Ter Linden.

The number of individual apparatus which preferably are composed as sections of an oxidation tower depends upon various degrees of influence, for example, of speed of oxidation and tetra content of the working solution, reaction temperature, pressure, oxygen content of the gas feed. Since air is the preferred oxidation gas for carrying out the process of the invention, the number of apparatus (i.e., sections) ranges between 2 and 6, especially between 2 and 4. Of course, by using a larger number of sections the advantages specified below are increased. However, in such case there is also an increased apparatus expense.

In the apparatus (sections) in which the liquid-gas mixture always is led in parallel flow from bottom to top in order to provide thorough inner mixing there can be provided suitable obstructions. These obstructions, for example, can be bubble caps or grids. Packing can also be employed in their place. Preferably there is used packing having dimensions of about 15 to 90 mm., especially of 25 to 50 mm. The height of the layers in which an exchange of materials in the phases occurs is designated as the "effective" height. Collectively the effective height of all sections in a given case composited to a column, should amount to 8 to 25 meters, especially 10 to 18 meters. In a surprising manner, it was found that the process of the invention despite the smaller effective height of the apparatus can be carried out in such a way that the, in a given case a composite column, sections can be driven to very high liquid cross sectional loads of 10 to 55 cu. m./sq. m.×h., especially 15 to 35 cu. m./sq. m.×h. This results in an especially good apparatus yield, which is connected to further advantages. The stated load limits again depend upon many factors (composition, tetra content, viscosity, surface tension and capacity of the work solution, size of the packaging, oxidation temperature, pressure, etc.), especially, however, they depend upon the amount of oxygen containing gas necessary for the oxidation. If air is employed as the oxidizing gas in the invention process then the gas cross sectional load (based on the free, unfilled column cross section) of 370 to 2050 normal cubic meters/sq. meter×hour, especially 550 to 1300 N cu. m./sq. m.×h. The cross sectional loads are at least twice as high as in the previously known processes.

The process of the invention can be carried out at normal pressure or increased pressures of 1 to 7 atmospheres absolute. The temperature can also be varied within wide limits, for example from 20 to 100° C. Since a high temperature increases the rate of oxidation and permits high cross sectional loads on the one hand but on the other hand, cause increased breakdown of product formation, temperatures in the range of 45 to 75° C. are preferred.

The process of the invention can be employed for the oxidation of all known working solutions used in the anthraquinone process. The process is especially suitable for working solutions which employ as reaction carriers alkyl anthraquinone, 2-methyl anthraquinone, 2-butyl anthraquinone, 2-isopropyl anthraquinone, 2-sec. amyl anthraquinone, 1,3-dimethyl anthraquinone, 2,7-dimethyl anthraquinone and mixtures of these as well as their partially nuclear hydrogenated derivatives, e.g., the tetrahydro anthraquinones such as 2-ethyl tetrahydro anthraquinone. As quinone solvents there can be used for example aromatic hydrocarbons such as tetramethyl benzene, t-butylbenzene, diphenyl, naphthalene, diethyl benzene, tetrahydronaphthalene, xylene, methyl naphthalene, mixtures of aromatic hydrocarbons boiling at 185–205° C., as hydroquinone solvents there can be used for example, phosphates or phosphonates such as trioctyl phosphate, tributyl phosphate, triamyl phosphate, dioctyl phenyl phosphonate, trihexyl phosphate and tridecyl phosphate, alcohols such as octanol-2, esters such as methyl cyclohexyl acetate. Working solutions of this type contain stable components and therefore permit high cross sectional loads, high oxidation rates and high temperatures whereby especially favorably apparatus yields results.

The most substantial advantages of the process of invention in comparison to the known ways of carrying out the oxidation step are summarized below:

(1) Lower apparatus expense, i.e., lower investment cost.

(2) Lower energy requirements, i.e., lower operation costs.

(3) Lower liquid holdup in the apparatus; which corresponds to a short residence time of the working solution in the apparatus, which is synonymous with a lowering of decomposition product formation.

(4) The system makes possible the oxidation of working solutions with high tetra contents.

(5) High cross sectional loads for gas and liquid which are at least twice as high as in known processes; accompanying this there are industrially favorable apparatus yields at degree of oxidation which are over 97% frequently even over 99%.

(6) Cessation of operation disturbances by clogging of the gasification candle and/or strong form development.

(7) Cessation intermediate closing of gas and liquid.

In the following comparison examples two typical working experiments are described which are carried out according to the known process (FIG. 1, Example 1) and according to the process of the invention (FIG. 3, Example 2). By the illustrative examples the advantages of the process of the invention are made evident. The process of the invention, however, is not limited to the illustrative form selected.

Unless otherwise indicated all parts and percentages are by weight.

EXAMPLE 1

In an industrial apparatus for the anthraquinone process a working solution was recycled which contained as the reaction carrier 90 grams of 2-ethyl tetrahydroanthraquinone plus 25 grams of ethyl anthraquinone per liter. The solvent consisted of a mixture of 75 volume percent of aromatic hydrocarbons (boiling range 185–205° C.) and 25 volume percent tri(2-ethylhexyl) phosphate. The flow of the working solution through the cyclic apparatus amounted to 130 cu. meters/hour. In the hydrogenation step the working solution was hydrogenated to the extent that there was formed a working solution having an amount of hydroquinone corresponding to an $H_2O_2$ equivalent of about 9.45 kg./cu. m. The working solution was led through an oxidation tower (analogous to lower 11 in FIG. 1) which was filled with 25 x 25 mm. ceramic Raschig rings, and had an effective height of 20 meters and a diameter of 3.7 meters. Together with the working solution there was fed into the bottom of the column 5000 normal cubic meters of air/hour (pressure at the bottom of the column 3.0 atmospheres absolute; pressure at the top of the column 1.5 atmospheres absolute), in which a mean temperature of 54° C. prevailed. In this manner of operation there was produced a 98.1% overall oxidation in which the $O_2$ content of the waste gas amounted to 6% and a current requirement of 0.44 kilowatt/kg. $H_2O_2$ was measured as the share for the air compresser.

EXAMPLE 2

260 cu. m./h. of a working solution having the same composition and hydroquinone content as in Example 1 was fed through an oxidation tower according to FIG. 3 together with 10,000 normal cu. m. of air/h. This tower also had a diameter of 3.7 meters and was divided into three sections which together had an effective height of only 15 meters. At the same pressure and temperature conditions as in Example 1, there was obtained an overall oxidation of 98.3% and the $O_2$ content of the waste gas was below 5.9% and there was a current requirement of 0.36 kilowatt/kg. $H_2O_2$ measured as the share for the air compressor.

What we claim is:

1. In the continuous process of producing hydrogen peroxide by alternate reduction and oxidation of a working solution of an anthraquinone the improvement comprising carrying out the oxidation stage in a plurality of vertically disposed columns in each of which an oxygen containing gas and the working solution are passed in parallel flow from the bottom upwardly, the concentration of oxygen in the oxygen containing gas varying inversely from column to column with the hydroquinone concentration in the working solution, the column containing the gaseous mixture lowest in oxygen also being the column containing the working solution having the highest hydroquinone concentration.

2. The process according to claim 1 wherein the oxygen containing gas is air.

3. The process according to claim 1 wherein the oxidation is carried out in 2 to 6 separate columns.

4. The process according to claim 3 wherein the oxidation is carried out in 2 to 4 separate columns.

5. The process according to claim 1 wherein the columns are axially aligned.

6. The process according to claim 1 wherein the columns are vertically displaced.

7. The process according to claim 1 wherein air is used as the oxidation gas and the liquid cross sectional load based on the free column cross section is from 10 to 55 cubic meters/sq. meter×hour.

8. The process according to claim 7 wherein the cross sectional load is 15 to 35 cubic meters/sq. meter×hour.

9. The process according to claim 7 wherein the gas cross sectional load is 370 to 2050 normal cubic meters/sq. meter×hour.

10. The process according to claim 9 wherein the gas cross sectional load is 550 to 1300 normal cubic meters/sq. meter×hour and the liquid cross sectional load is 15 to 35 cubic meters/sq. meter×hour.

11. The process according to claim 9 wherein the oxidation is carried out at a pressure of 1 to 7 atmospheres absolute.

12. The process according to claim 11 wherein the pressure is 2 to 4 atmospheres absolute.

13. The process according to claim 11 wherein the oxidation is carried out at 20–100° C.

14. The process according to claim 13 wherein the oxidation is carried out at 45 to 75° C.

15. The process according to claim 1 wherein the oxidation is carried out with a working solution containing an alkyl anthraquinone or tetrahydroanthraquinone as the reaction carrier and a phosphate ester and aromatic hydrocarbon as the solvent.

References Cited

UNITED STATES PATENTS

| 2,867,507 | 1/1959 | Gleason, Jr. et al. | 260—369 |
|---|---|---|---|
| 3,231,251 | 1/1966 | Scheibel | 23—270.5 |
| 3,486,743 | 12/1969 | Todd | 23—270.5 |
| 2,966,398 | 12/1960 | Jenney | 260—369 |

OSCAR R. VERTIZ, Primary Examiner

H. S. MILLER, Assistant Examiner

U.S. Cl. X.R.

23—260; 260—369; 423—589